US011102969B2

(12) United States Patent
Peters et al.

(10) Patent No.: US 11,102,969 B2
(45) Date of Patent: Aug. 31, 2021

(54) IDENTIFICATION OF BENEFICIAL INSECTS AND/OR POLLUTANTS IN A FIELD FOR CROP PLANTS

(71) Applicant: BASF Agro Trademarks GmbH, Ludwighafen am Rhein (DE)

(72) Inventors: Ole Peters, Langenfeld (DE); Andreas Johnen, Münster (DE); Maria Tackenberg, Münster (DE)

(73) Assignee: BASF Agro Trademarks GmbH, Ludwighafen am Rhein (DE)

( * ) Notice: Subject to any disclaimer, the term of this patent is extended or adjusted under 35 U.S.C. 154(b) by 324 days.

(21) Appl. No.: 16/339,418

(22) PCT Filed: Sep. 29, 2017

(86) PCT No.: PCT/EP2017/074778
§ 371 (c)(1),
(2) Date: Apr. 4, 2019

(87) PCT Pub. No.: WO2018/065308
PCT Pub. Date: Apr. 12, 2018

(65) Prior Publication Data
US 2020/0037596 A1 Feb. 6, 2020

(30) Foreign Application Priority Data
Oct. 7, 2016 (EP) .................... 16192826

(51) Int. Cl.
*A01M 1/02* (2006.01)
*G01S 17/89* (2020.01)
*G06Q 50/02* (2012.01)

(52) U.S. Cl.
CPC ............. *A01M 1/026* (2013.01); *G01S 17/89* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 2013/0011011 A1 | 1/2013 | Fryshman | |
| 2018/0295771 A1 | 10/2018 | Peters | |
| 2019/0174739 A1 | 6/2019 | Peters et al. | |
| 2019/0191617 A1 | 6/2019 | Hoffmann et al. | |
| 2019/0202959 A1 | 7/2019 | Kajihara et al. | |
| 2019/0208762 A1 | 7/2019 | Schafer et al. | |

FOREIGN PATENT DOCUMENTS

| | | |
|---|---|---|
| WO | WO-02088700 A1 | 11/2002 |
| WO | WO-2012054397 A1 | 4/2012 |
| WO | WO-2013017860 A1 | 2/2013 |
| WO | WO-2014035993 A2 | 3/2014 |
| WO | WO-2015132208 A1 | 9/2015 |

OTHER PUBLICATIONS

International Search Report for PCT/EP2017/074778 dated Dec. 20, 2017.
Written Opinion of the International Searching Authority for PCT/EP2017/074778 dated Dec. 20, 2017.
U.S. Appl. No. 16/307,967, filed Dec. 7, 2018.
Anne-Katrin Mahlein, "Plant Disease Detection by Imaging Sensors—Parallels and Specific Demands for Precision Agriculture and Plant Phenotyping", Plant Disease, vol. 100, Issue 2, Feb. 2016, pp. 241-251.
Bauriegel, et al., "Chlorophyll fluorescence imaging to facilitate breeding of Bremia lactucae-resistant lettuce cultivars", Computers and Electronics in Agriculture, vol. 105, Jul. 2014, pp. 74-82.
Bock, et al., "Plant Disease Severity Estimated Visually, by Digital Photography and Image Analysis, and by Hyperspectral Imaging", Critical Reviews in Plant Sciences, vol. 29, Issue 2, 2010, pp. 59-107.
Brydegaard, et al., "Super Resolution Laser Radar with Blinking Atmospheric Particles—Application to Interacting Flying Insects (Invited Paper)", Progress in Electromagnetics Research, vol. 147, 2014, pp. 141-151.
Günther Witzany, "Plant Communication from Biosemiotic Perspective", Plant Signaling & Behavior, vol. 1, Issue 4, 2006, pp. 169-178.
Hoffman, et al., "Range-resolved optical detection of honeybees by use of wing-beat modulation of scattered light for locating land mines", Applied Optics, vol. 46, Issue 15, 2007, pp. 3007-3012.
Kirkeby, et al., "Observations of movement dynamics of flying insects using high resolution lidar", Scientific Reports—6, Article No. 29083, 2016, 11 pages.
Konanz, et al., "Advanced Multi-Color Fluorescence Imaging System for Detection of Biotic and Abiotic Stresses in Leaves", Agriculture, vol. 4, Issue 2, 2014, pp. 79-95.
Mahlein, et al., "Hyperspectral imaging for small-scale analysis of symptoms caused by different sugar beet diseases", Plant Methods, vol. 8, Issue 3, 2012, 13 pages.
Mahlein, et al., "Recent advances in sensing plant diseases for precision crop protection", European Journal of Plant Pathology, vol. 133, Issue 1, May 2012, pp. 197-209.
Mewes, et al., "Spectral requirements on airborne hyperspectral remote sensing data for wheat disease detection", Precision Agriculture, vol. 12, Dec. 2011, pp. 795-812.
Neumann, et al., "Erosion Band Features for Cell Phone Image Based Plant Disease Classification", 2014 22nd International Conference on Pattern Recognition, Aug. 24-28, 2014, pp. 3315-3320.

(Continued)

*Primary Examiner* — Roy Y Yi
(74) *Attorney, Agent, or Firm* — Lowenstein Sandler LLP

(57) ABSTRACT

The present invention relates to the identification of beneficial insects and/or harmful organisms in a field for crop plants.
The presence of a species in the field is captured by one or more sensors. One or a plurality of suggestions is/are generated as to which species it could be. Based on one or more models, the probability that the detected species could be a proposed species is calculated in each case. The site at which the species is detected, the detection time and preferably further parameters that affect the presence of the proposed species in the field are included in a model. The expressive capacity of the sensor or sensors is increased by means of the modeling.

17 Claims, No Drawings

(56) References Cited

OTHER PUBLICATIONS

Newe, et al., "proPlant expert.com—an online consultation system on crop protection in cereals, rape, potatoes and sugarbeet", Bulletin OEPP EPPO Bulletin, vol. 33, Issue 3, Dec. 2003, pp. 443-449.
Oerke, et al., "Thermal imaging of cucumber leaves affected by downy mildew and environmental conditions", Journal of Experimental Botany, vol. 57, Issue 9, Jun. 2006, pp. 2121-2132.
Oerke, et al., "Thermographic assessment of scab disease on apple leaves", Precision Agriculture, vol. 12, Issue 5, Oct. 2011, pp. 699-715.
Pethybridge, et al., "Leaf Doctor: A New Portable Application for Quantifying Plant Disease Plant Disease Severity", vol. 99, Issue 20, 2015, pp. 1310-1316.
Raman, et al., "Detecting Insect Flight Sounds in the Field: Implications for Acoustical Counting of Mosquitoes", Transactions of the ASABE, vol. 50, Issue 4, 2007, pp. 1481-1485.
Wang, et al., "A new automatic identification system of insect images at the order level", Knowledge-Based Systems, vol. 33, Sep. 2012, pp. 102-110.

IDENTIFICATION OF BENEFICIAL INSECTS AND/OR POLLUTANTS IN A FIELD FOR CROP PLANTS

CROSS-REFERENCE TO RELATED APPLICATIONS

This application is a national stage application (under 35 U.S.C. § 371) of PCT/EP2017/074778, filed Sep. 29, 2017, which claims benefit of European Application No. 16192826.2, filed Oct. 7, 2016, both of which are incorporated herein by reference in their entirety.

The present invention relates to the identification of beneficial insects and/or harmful organisms in a field for crop plants.

In modern agriculture, the automated detection and recognition of beneficial insects and/or harmful organisms within agriculturally used areas plays an increasingly important role. For example, an important task is to distinguish useful pollen donors from harmful insects.

A further important task is that of recognizing whether a damage threshold had been exceeded in the presence of a harmful organism in the field. The damage threshold refers to the density of infestation by harmful organisms at which control becomes economically viable. Before this value is reached, the additional economic expense of control is greater than the feared crop shortfall. If the infestation density exceeds this value, the costs of control are at the very least compensated for by the additional yield expected.

Depending on the nature of a pest, the damage threshold can vary widely. In the case of pests that can only be controlled with great expense and negative concomitant effects on further production, the damage threshold can be extremely high. However, in cases where even a minor infestation can become the source of a major outbreak, the damage threshold can be extremely low.

It should be noted that for many pests, the point in time at which the damage threshold is exceeded does not precisely correspond to the optimum point in time for control measures. The control threshold is often below the economic damage threshold, as a certain period of time must elapse before an applied plant protection agent can exert its effect.

The most important prerequisite that allows recognition of the damage and/or control threshold is efficient infestation control.

For infestation control of harmful insects, for example, glued paint panels or yellow capture shells are used. Many pests, such as rapeseed pests, are attracted by the yellow color of the shell or panel. The yellow trapping cell is filled with water to which a surfactant has been added in order to reduce the surface tension, so that attracted pests will drown. In the case of the glued panels, the pests get stuck in the glue.

However, manual placement and control of traps is laborious and time-consuming.

WO2014/035993 A2 discloses an automated system by means of which mosquitoes are attracted so that saliva samples can be taken. The saliva samples are analyzed in order to identify the mosquito species. The system is relatively expensive. In addition, the use of attractants is disadvantageous in that the attracted organisms are influenced, and it is not clear whether the organisms would have been attracted to the area of the trap by themselves. Determination of infestation densities is made more difficult by the use of attractants, because the influence of the attractant must be determined.

By means of LiDAR (light detection and ranging), flying insects in their natural environment can be detected and identified. The insects' wing beats cause modulation of the backscattered laser light, so that an insect can be identified for example by its characteristic wing beats.

Mikkel Brydegaard et al. describe a LiDAR system for the identification of flying insects based on the so-called Scheimpflug principle (*Super Resolution Laser Radar with Blinking Atmospheric Particles Application to Interacting Flying Insects*, Progress In Electromagnetics Research, Vol. 147, 141-151, 2014). David S. Hoffmann et al. describe a LiDAR system for recognition of honeybees (*Range-resolved optical detection of honeybees by use of wing-beat modulation of scattered light for locating land mines*, APPLIED OPTICS, Vol. 46, No. 15, 2007).

Although the technology is continually improving (Carsten Kirkeby et al., *Observations of movement dynamics flying insects using high resolution lidar*, Scientific Reports|16:29083| DOI: 10.1038/srep29083), the identification of individual species in the natural environment is not yet sufficiently accurate at present.

In addition to the identification of harmful insects, there are also other harmful organisms such as fungi and pathogens that must be automatically detected and for which infestation density must be determined. Hyperspectral sensors can be used in order to derive findings from the reflectance properties of vegetation and ground formations. Anne-Katrin Mahlein et al. used hyperspectral sensors to detect sugar beet diseases (*Hyperspectral imaging for small-scale analysis of symptoms caused by different sugar beet diseases*; Plant Methods 2012, 8:3; doi: 10.1186/1746-4811-8-3).

In the article *Plant Disease Detection by Imaging Sensor—Parallels and Specific Demands for Precision Agriculture and Plant Phenotyping*, Plant Disease, February 2016, Vol. 100, No. 2 pp. 241-251; http://dx.doi.org/10.1094/PDIS-03-15-0340-F), further methods allowing detection of plant diseases are summarized.

However, a drawback of all known detection technologies is that they are inexact in practice. In frequent cases, individual pests cannot be sufficiently specified. Although the detection of pests in very low numbers or in an extremely early stage of development does provide information on their presence, differentiation is not achieved to the extent required for determining damage thresholds, selecting plant protection agents, or other measures.

There is therefore a need to increase the expressive capacity of sensors for the identification of harmful organisms.

According to the invention, this object is achieved by means of the subject matter of independent claims 1, 13 and 14. Preferred embodiments are found in the dependent claims and in the present description.

A first subject matter of the present invention is thus a method comprising the steps of:

detecting a species to be identified with a sensor in a field in which crop plants are cultivated, generating at least one species suggestion for the detected species to be identified, determining the location of the sensor and/or the detected species to be identified, calculating the probability of occurrence of the at least one species suggestion in the field using a model in which the location of the sensor and/or the detected species to be identified and the time of detection are included.

A further subject matter of the present invention is a computer program product comprising a data carrier on which a computer program is stored, which can be loaded into the working memory of a computer and causes the computer system to carry out the following steps:

receiving at least one suggestion for a species to be identified whose presence has been detected by at least one sensor in a field for crop plants, receiving the location of the at least one sensor and/or the site at which the detected species was located at the time of detection, calculating the probability that the detected species is the suggested species, wherein a model is used for calculating the probability in which the location of the sensor and/or the detected species and the time of detection are included.

A further subject matter of the present invention is a system comprising at least one sensor for detecting the presence of a species to be identified in a field for crop plants, means for generating a suggestion for the species detected by the at least one sensor, means for determining the location of the at least one sensor and/or the site at which a species was located at the time of detection by the at least one sensor, a computer system configured to calculate a probability that the detected species is the suggested species, wherein a model is used for calculating the probability in which the location of the sensor and/or the detected species and the time of detection are included.

The invention is explained in further detail below without distinguishing among the subjects of the invention (method, system, computer program product). Rather, the following explanations are intended to apply analogously to all subjects of the invention, regardless of the context (method, system, computer program product in which they occur).

In a first step of the method according to the invention, a species to be identified in a field in which crop plants are cultivated is detected by a sensor or by a plurality of sensors.

The term "crop plant" is understood to refer to a plant that is cultivated by human intervention in a targeted manner as a useful or ornamental plant.

The term "field" is understood to refer to a spatially delimitable area of the Earth's surface that is agriculturally used in that crop plants are cultivated, provided with nutrients and harvested in such a field.

The term "species to be identified" is understood to refer to a species that has not yet been specified with sufficient accuracy to allow a statement to made as to whether this species is useful, harmful or insignificant for the crop plants and/or whether measures must be taken in order to increase or decrease the number of the species in the field.

The term "detection of a species" is understood to refer to the detection of the presence of the species. The detection of the species is a first step in its identification.

The term "species" is understood to refer to a organism that can appear in the cultivation of crop plants in a field. The species can be a useful organism. An example of a useful organism is a pollen donor (pollinator). However, the species can also be a harmful organism.

The term "harmful organism", or in short, "pest", is understood to refer to an organism that appears in the cultivation of crop plants and can damage the crop plant, negatively affect the harvest of the crop plant or compete with the crop plant for natural resources. Examples of such harmful organisms are weeds, weed grasses, animal pests such as e.g. beetles, caterpillars and worms, fungi and pathogens (e.g. bacteria and viruses). Although viruses are not considered to be organisms from a biological standpoint, they are to be included in the present case under the term harmful organism.

The term "sensor" is understood to refer to a device with which the presence of the species to be identified in the field for crop plants can be recorded. This sensor is also referred to in the following as a "species sensor".

The sensor detects the presence of a species based on one or a plurality of characteristic signals. The signals can be emitted directly by the species itself. An example of such a directly emitted signal is e.g. the noise produced by the wing beats of many flying insects during flight. The sensor can also emit a signal that is modified in a characteristic manner by the species to be identified and then sent back. An example of such a modified, sent back signal is the modulation of a laser beam by the characteristic wing movements of a flying object. A sensor ordinarily detects electromagnetic and/or acoustic and/or chemical and/or electrical signals and/or other signals that indicate the presence of a species.

The sensor can be a sensor that directly or indirectly detects the species to be identified. In direct detection, the presence of the species results in a signal that is registered by the sensor; in indirect detection, the presence of the species causes a change in the environment of the species that is registered by the sensor. As an example of direct detection, one can mention a flying insect that moves in and/or over the field and whose presence is registered by a sensor. As an example of indirect detection, one can mention a disease that causes changes in the crop plant such as e.g. discoloration of the leaves. The discoloration of the leaves is registered by means of a sensor and thus indirectly indicates the presence of a pathogen.

In an embodiment, the sensor functions automatically, i.e. human intervention is not necessary for the presence of the species to be registered by the sensor.

In an alternative embodiment, the sensor is operated by a user.

The sensor can be a part of a stationary device that is positioned in, on, and/or over the field and monitors a part of the field or the entire field.

It is also conceivable for the sensor to be a part of a mobile device that can be carried by the user in the field. It is also conceivable for the sensor to be attached to an agricultural machine and to receive signals when the agricultural machine moves in the field. The use of a manned or unmanned aircraft to which the sensor is attached and which receives signals when the aircraft moves over the field is also conceivable.

The sensor can continuously detect signals in a detection area. However, it is also conceivable for the sensor to register signals at definable times and/or during definable periods of time. It is further conceivable for the sensor to be caused to detect signals by means of a trigger. For example, this trigger can cause the sensor to detect signals when a certain predefined event has occurred, such as e.g. the occurrence of movement in the vicinity of the sensor, the occurrence of a certain degree of brightness (or darkness), the onset of precipitation, a certain humidity or temperature, or the like. However, it is also conceivable for a user to trigger the sensor.

It is also conceivable for there to be a plurality of sensors. The sensors can be of the same type, but the use of sensors of different types is also conceivable.

Several types of preferred sensors are described in the following.

In a preferred embodiment, the sensor is an optical sensor, i.e. the signals detected by the sensor are optical signals, i.e. electromagnetic radiation in the range of visible and/or ultraviolet and/or infrared light. Examples of optical sensors are RGB sensors, LiDAR sensors, hyperspectral sensors and thermographic sensors.

The sensor can for example be a digital image sensor for visible light, by means of which for example RGB images of a part of the field can be recorded. Digital photographs of plants and/or plant parts have already been used in the past for the detection and quantitation of diseases (C. H. Bock et al., *Plant disease severity estimated visually, by digital photography and image analysis, and by hyperspectral imaging*, Crit. Rev. Plant Sci. 2010, 29: 59-107; M. Neumann et al.: *Erosion band features for cell phone image based plant disease classification*, Proceedings of the 22nd International Conference on Pattern Recognition (ICPR), Stockholm, Sweden, 24-28 August 2014, pp. 3315-3320).

Instead of RGB images, digital images can of course also be generated that use color spaces other than the RGB color space (CIELUV, CIELAB, YUV, HSV, etc.).

In a preferred embodiment, the image sensor is part of a mobile device that is carried by a user in the field. For example, the mobile device can be a smartphone, a tablet computer or a digital camera, by means of which the user captures digital images of species to be identified and/or plant parts.

The sensor can also be an imaging hyperspectral sensor. This detects e.g. the crop plant and can recognize infestation with a harmful organism based on changes in the reflected spectrum of the crop plant compared to a healthy crop plant (A. K. Mahlein et al.: *Recent advances in sensing plant diseases for precision crop protection*, Eur. J. Plant Pathol. 133 (2012) 197-209; T. Mewes et al.: *Spectral requirements on airborne hyperspectral remote sensing data for wheat disease detection*, Precis. Agric. 12 (2011) 795-812; E.-C. Oerke et al.: *Proximal sensing of plant diseases, Detection of Plant Pathogens*, Plant Pathology in the 21st Century, edited by M. L. Gullino et al., Springer Science and Business Media, Dordrecht (NL) 2014, pp. 55-68).

The sensor can also be an imaging thermographic sensor. Thermography allows e.g. the visualization of differences in the surface temperature of plant parts. The temperature of plant parts (in particular leaves) is determined by environmental factors and cooling resulting from transpiration. Some plants are capable of elevating their temperature above the ambient temperature (thermogenic plants). Plants infested with harmful species can show deviations in surface temperature compared to healthy plants (E.-C. Oerke et al.: *Thermal imaging of cucumber leaves affected by mildew and environmental conditions*, J. Exp. Bot. 57 (2006) 2121-2132; E.-C. Oerke et al.: *Thermographic assessment of scab disease on apple leaves*, Prec. Agric. 12 (2011) 699-715). The presence of a pathogen can thus be indirectly detected by a thermographic sensor.

The sensor can also be an imaging fluorescence sensor. Using this kind of sensor, it is possible for example to make changes in the photosynthetic activity of plants visible (E. Bauriegel et at: *Chlorophyll fluorescence imaging to facilitate breeding of Bremia lactucae-resistant lettuce cultivars*, Comput. Electron. Agric. 105 (2014) 74-82; S. Konanz et al.: *Advanced multi-color fluorescence imaging system for detection of biotic and abiotic stresses in leaves*, Agriculture 4 (2014) 79-95). Differences in photosynthetic activity can indicate the presence of a pathogen.

The sensor can also be a LiDAR sensor. In this case, optical signals are emitted that are scattered back by objects. The presence of a species can be detected using the backscattered signals. LiDAR is suitable in particular for the detection of flying insects (Mikkel Brydegaard et al.: *Super Resolution Laser Radar with Blinking Atmospheric Particles—Application to Interacting Flying Insects*, Progress in Electromagnetics Research Vol. 147, 141-151, 2014; David S. Hoffmann et al.: *Range-resolved optical detection of honeybees by use of wing-beat modulation of scattered light for locating land mines*, APPLIED OPTICS, Vol. 46, No. 15, 2007; Carsten Kirkeby et al., *Observations of movement dynamics of flying insects using high resolution lidar*, Scientific Reports 6:29083 1 DOI: 10.1038/srep29083).

The sensor can also be a microphone. The microphone detects noises and/or sounds produced by the species. The presence of the species can be detected using the noises and/or sounds (*Detecting Insect Flight Sounds in the Field: Implications for Acoustical Counting of Mosquitoes*, Transactions of the ASABE, 2007, Vol. 50(4): 1481-1485).

The sensor can also be a sensor for chemical substances in the air, such as e.g. a gas chromatograph (GC) or a mass spectrometer (MS) or a GC/MS combination. These can be used to detect substances emitted by plants as a reaction to infestation with a harmful organism (G. Witzany: *Plant Communication from Biosemiotic Perspective*, Plant Signal Behav. 2006 July-August; 1(4): 169-178; Signaling and Communication in Plants, Series Ed.: C. Garcia-Mata, Springer ISSN: 1867-9048).

The use of a plurality of the above-mentioned or further sensors next to one another and/or the use of sensors in which a plurality of detection technologies are combined, such as e.g. a Raman LiDAR sensor or a fluorescence LiDAR sensor (WO 2013017860 A1), is also conceivable.

In a further step of the method according to the invention, at least one species suggestion is generated for the detected species to be identified.

This ordinarily takes place after analysis of the signal that the sensor had detected as a result of the presence of the species. For this purpose, the sensor can be connected to a computer system that analyzes the signal detected by the sensor in order to generate at least one suggestion, based on characteristic features of the signal, as to which species the species to be identified could be.

For example, if the sensor is an image sensor that has produced a digital image of the species to be identified, the digital image can be subjected to image analysis on the computer system. The direct recognition of species by analysis of images belongs to the prior art (cf. e.g. US 20130011011 A1, J. Wang et al.: *A new automatic identification system of insect images at the order level*, Knowledge-Based Systems, Vol. 33, 2012, 102-110). The same applies to the indirect recognition of the species; images of disease symptoms of a plant can also be subjected to image analysis in order to detect pathogens (S. J. Pethybridge at al., *Leaf doctor: a new portable application for quantifying plant disease severity*, Plant Dis 99 (2015) 1310-1316).

As discussed above, the signals detected by the sensor are ordinarily not clear enough to allow a species to be unequivocally classified based on a signal. Ordinarily, multiple species are possible. Accordingly, multiple suggestions are generated as to which species it could be. However, it is also conceivable that an assumption of the species present is to be confirmed by means of the present invention; in this case, only a suggestion is generated, which is then to be confirmed to be correct or incorrect.

At least one suggestion is therefore generated as to which species the species detected (directly or indirectly) by the sensor is.

In a further step of the method according to the invention, the probability that the detected species is the at least one suggested species is calculated. If multiple suggestions were generated, the corresponding probability is calculated for each individual suggestion.

The at least one suggested species is included in this calculation. Additionally, information is included as to where the detected species was detected. For this purpose, the location of the sensor or the site at which the species was located at the time of detection can be used. As a rule, the two above-mentioned locations will not be far from each other, so that for the present invention, it will ordinarily not be important which of the above-mentioned locations is included in the calculation. However, it may make a difference in the case of relatively long-range sensors such as LiDAR.

If it can make a difference, the site at which the species to be identified was located at the time of its detection should be used, as what is important in the calculation of probability is to determine how probable it is in general that the suggested species will occur at the detection time and at the detection site.

Determination of the location is ordinarily carried out by a GPS sensor or a comparable sensor. Ordinarily, a GPS sensor is located in the immediate vicinity of the sensor for detecting the presence of a species to be detected (species sensor). Preferably, the species sensor and the GPS sensor are components of the same device. It is conceivable, for example, that a smartphone is used that in addition to an image sensor for taking digital images also comprises a GPS sensor.

However, it is also conceivable that the location does not have to be specially determined, but is already known, e.g. because the sensor is a stationary sensor that has been set up at a known position. It is also conceivable that the sensor has an identification number that it transmits to an external computer system during data transmission. In this case, the transmitted identification number can also be used e.g. to determine the location of the sensor from a database.

The time of the detection of the species to be identified is further included in the calculation of probability. It can make a difference for the presence of a species whether it is spring, summer, fall, or winter, as certain species occur only in certain seasons. It can make a difference whether it is night or day, as certain species occur at particular times of the day or night. For this reason, the time of detection is preferably determined at least to the exact hour, including the date, and used for the calculation.

If a species to be identified has been detected by at least one sensor, the location of the at least one sensor and/or the location of the species to be identified at the time of detection has been detected, the time of detection has been detected, and at least one suggestion has been generated as to which species the species to be identified could be, the probability that the detected species is the at least one suggested species is calculated in a further step of the method according to the invention.

That probability of occurrence of such a suggested species at the time of detection and at the location of detection is calculated.

A model is used for calculation of probability. Such models are described in the prior art, and they are commercially available (Neve M., Meier H., Johnen A., Volk T.: *proPlant expert corn—an online consultation system on crop protection in cereals, rape, potatoes and sugarbeet*. EPPO Bulletin 2003, 33, 443-449; Johnen A., Williams I. H., Nilsson C., Klukowski Z., Luik A., Ulber B.: *The proPlant Decision Support System: Phenological Models for the Major Pests of Oilseed Rape and Their Key Parasitoids in Europe*, Biocontrol-Based Integrated Management of Oilseed Rape Pests (2010) Ed.: Ingrid H. Williams. Tartu 51014, Estonia. ISBN 978-90-481-3982-8. p. 381-403; www.proPlantexpert.com).

Preferably, in addition to the location of detection and the time of detection, further parameters that can affect the presence of the proposed species are also included in the calculation of the probabilities.

Examples of these further parameters are parameters concerning the crop plant (development stage, growth conditions, plant protection measures) and the weather (temperature, sunshine duration, wind speed, precipitation).

Further parameters concern environmental conditions prevailing at the detection site, such as e.g. soil type and vegetation in the environment.

Further parameters concern the suggested species, such as economic limit values, pest/disease pressure and occurrence of species in the environment.

The above-mentioned parameters are measured for the time and location of detection. In addition to or instead of the individual time value, the average daily value and/or the average weekly value can also be of interest.

The history of the above-mentioned parameters can also be of interest. For, example, it is conceivable that the species to be identified is a harmful organism that forms stable patches. As a rule, the patches are observed over a period extending beyond the vegetation period of the crop plant. An example is the slender meadow foxtail (*Alopecurus myosuroides* Huds), which shows seed dispersal in the vicinity of the mother plant. The weed patches are stable or recurrent; however, new ones can also be added.

Using the above-mentioned parameters, an infestation risk can be estimated. The more data are available, the more precise the prediction.

The calculated probability can be indicated to a user. In an embodiment of the present invention, the at least one species suggestion, together with the calculated probability that the detected species is the species suggestion, is indicated to a user. The indication can for example be carried out on a monitor or display by means of text and/or symbols. Outputting of a voice message is also conceivable.

The calculated probability can be used in order to evaluate the generated species suggestions. For example, if three species suggestions were generated and three different probabilities were calculated, the probabilities can be used to reduce the possibilities as to the species in question; in the best case, only one possibility remains. If only one suggestion was generated (verification), the calculated probability can be used to make a statement as to whether the suggestion is more true or more false.

In an embodiment, one or a plurality of species suggestions that are above a minimum probability is/are optionally indicated to a user with the corresponding calculated probability. For example, it is conceivable that only those species are displayed for which the calculated probability for example is at least 60%.

The expressive capacity of a sensor for detecting the presence of a species is thus increased by the present invention.

The calculated probability can further be used to optimize the sensor and/or the means for generating the at least one species suggestion. In a preferred embodiment, the probabilities determined therefore flow back into the system comprising the sensor and/or the means for generating the at least one species suggestion. In cases where the means for generating the at least one species suggestion is a self-learning system in particular, the calculated probabilities can be used to increase the predictive capacity of the self-learning system.

The calculated probability can further be used to provide a recommendation for action. If a species has been detected and it has been determined by means of the present invention that the detected species is with a high degree of probability a harmful organism, corresponding measures can be initiated for controlling the harmful organism. Such a recommendation for action can be indicated to a user.

The present method can be completely or partially carried out by a computer system. Such a computer system can be an individual computer or a plurality of computers that are networked to one another. The terms computer and computer system are to be understood in their broad sense. Examples of computers and computer systems are tablet computers, notebook computers and other mobile computing systems and smartphones, multiprocessor systems, microprocessor-based systems, and programmable consumer electronics, as well as digital cameras and PDAs (personal digital assistants).

Ordinarily, a computer program is provided that can be loaded into the working memory of a computer system and then carries out one or a plurality of steps of the method according to the invention. The computer program is ordinarily stored on a data carrier and is commercially available as a computer program product. The computer program product can be provided e.g. in the form of a compact disc (CD), a digital versatile disc (DVD), a USB memory stick (USB=Universal Serial Bus) or as a download.

The computer program according to the invention causes the computer system to carry out the following steps:

receiving at least one suggestion for a species to be identified whose presence has been detected by at least one sensor in a field for crop plants, receiving the location of the at least one sensor and/or the site at which the detected species was located at the time of detection, calculating the probability that the detected species is the suggested species, wherein a model is used for calculating the probability in which the location of the sensor and/or the detected species is/are included.

A further subject matter of the present invention is a system comprising at least one sensor for detecting the presence of a species to be identified in a field for crop plants, means for generating a suggestion for the species detected by the at least one sensor, means for determining the location of the at least one sensor and/or the site at which a species was located at the time of its detection by the at least one sensor, a computer system configured to calculate a probability that the detected species is the suggested species, wherein a model is used for calculating the probability in which the location of the sensor and/or the detected species and the time of detection are included.

Preferably, the system has means for indicating to a user species suggestions and/or calculated probabilities and/or recommendations for action.

In a preferred embodiment, the sensor is connected to a first computer system. Depending on the sensor type, the sensor is used for detecting electromagnetic, acoustic, chemical and/or other signals and ordinarily converting them into electrical signals. The first computer system is used to analyze and interpret the electrical signals. Ordinarily, they are first digitized for this purpose. However, it is also conceivable to process, analyze and interpret analog signals.

Preferably, the first computer system is configured such that, based on the electrical signals, it generates at least one suggestion as to which species the detected species to be identified could be.

Preferably, the species sensor and the first computer system are components of the same device, which is positioned in or over the field or can be moved within or above the field. Preferably, a GPS sensor (for determining the detection site) and/or a chronometer (a clock for determining the detection time) are part of this device. Preferably, the first computer system is configured such that it can determine the position of the device by means of a GPS sensor.

In a preferred embodiment, the first computer system transmits the generated species suggestions together with information on location and time to a second computer system that is preferably not located in the field and is preferably stationary. A prediction model is installed on the second computer system that can calculate the probability that the suggested species will occur in the field. Preferably, the prediction model uses further parameters that exert an influence on the presence of the proposed species in the field (see above).

Preferably, the second computer system transmits the calculated probabilities to the first computer system. The calculated probabilities can be indicated to a user on the first and/or second computer system. Preferably, recommendations for action are transmitted to a user in addition to the probabilities.

The invention claimed is:

1. A method comprising the steps of:
   detecting a species to be identified with a sensor in a field in which crop plants are cultivated,
   generating at least one species suggestion for the detected species to be identified,
   determining the location of the sensor and/or the detected species to be identified,
   calculating the probability of occurrence of the at least one species suggestion in the field using a model in which the location of the sensor and/or the detected species to be identified and the time of detection are included.

2. The method according to claim 1, wherein the species to be identified is a harmful organism.

3. The method according to claim 2, wherein the species to be identified is a pathogen whose presence is indirectly detected.

4. The method according to claim 2, wherein the species to be identified is an animal pest whose presence is directly detected.

5. The method according to claim 1, wherein in the calculation of the probability, in addition to the detection site and time, one or more of the following parameters is included: temperature, sunshine duration, wind speed, precipitation, development stage of the crop plant, plant protection measures already carried out.

6. The method according to claim 1, wherein the sensor is a sensor for electromagnetic radiation.

7. The method according to claim 1, wherein the sensor is an imaging sensor.

8. The method according to claim 1, wherein the sensor is a LiDAR sensor, a hyperspectral sensor, an RBG sensor and/or a thermography sensor.

9. The method according to claim 1, wherein the at least one species suggestion, together with the probability that the detected species is the species suggestion, is indicated to a user.

10. The method according to claim 1, wherein those species suggestions are indicated to a user for which the calculated probability lies above a minimum probability.

11. The method according to claim 1, wherein a species suggestion is indicated together with a recommendation for action.

12. The method according to claim 1, wherein the sensor is part of a self-learning system and the calculated probability is used to improve the predictive capacity of the system.

13. A computer program product comprising a data carrier on which a computer program is stored, which can be loaded into the working memory of a computer and causes the computer system to carry out the following steps:
   receiving at least one suggestion for a species to be identified whose presence has been detected by at least one sensor in a field for crop plants,
   receiving the location of the at least one sensor and/or the site at which the detected species was located at the time of detection,
   calculating the probability that the detected species is the suggested species, wherein a model is used for calculating the probability in which the location of the sensor and/or the detected species and the time of detection are included.

14. A system comprising at least one sensor for detecting the presence of a species to be identified in a field for crop plants,
   means for generating a suggestion for the species detected by the at least one sensor,
   means for determining the location of the at least one sensor and/or the site at which a species was located at the time of detection by the at least one sensor,
   a computer system configured to calculate a probability that the detected species is the suggested species, wherein a model is used for calculating the probability in which the location of the sensor and/or the detected species and the time of detection are included.

15. The system according to claim 14, comprising
   a first computer system and a second computer system,
   wherein the first computer system is connected to the at least one sensor and is configured such that it generates at least one species suggestion on the basis of the signals detected by the at least one sensor and transmits the at least one species suggestion, to the second computer system,
   wherein the second computer system has at least one prediction model and is configured such that it can receive the at least one species suggestion, and based on the at least one prediction model, can determine the respective probability that a suggested species is the detected species,
   wherein the second computer system is optionally configured such that it can indicate the respective calculated probability to a user and/or transmit it to the first computer system and/or indicate to a user a recommendation for action, and
   wherein the first computer system is optionally configured such that it can receive the respective calculated recommendation for action from the second computer system and preferably indicate it to a user.

16. The method according to claim 1, wherein a species suggestion is indicated together with a recommendation as to how the species can be controlled if said species is a harmful organism.

17. The system according to claim 14, comprising
   a first computer system and a second computer system,
   wherein the first computer system is connected to the at least one sensor and is configured such that it generates at least one species suggestion on the basis of the signals detected by the at least one sensor and transmits the at least one species suggestion, together with the information on the detection site and/or the detection time, to the second computer system,
   wherein the second computer system has at least one prediction model and is configured such that it can receive the at least one species suggestion, and information on the detection site and/or the detection time, and based on the at least one prediction model, can determine the respective probability that a suggested species is the detected species,
   wherein the second computer system is configured such that it can indicate the respective calculated probability to a user and/or transmit it to the first computer system and/or indicate to a user a recommendation for action, and
   wherein the first computer system is configured such that it can receive the respective calculated recommendation for action from the second computer system and preferably indicate it to a user, together with recommendations for action, and/or can use it to improve the generation of species suggestions.

\* \* \* \* \*